United States Patent [19]

Dawson

[11] 4,287,625
[45] Sep. 8, 1981

[54] PORTABLE BOAT DOCK

[76] Inventor: Max Dawson, 120 Hidden Valley Rd., Bayside, Calif. 95524

[21] Appl. No.: 38,071

[22] Filed: May 11, 1979

[51] Int. Cl.³ .............................................. B63B 17/00
[52] U.S. Cl. ........................................ 9/1.6; 405/219; 114/263; 114/264
[58] Field of Search ..................... 405/218–221, 405/211, 212, 215; 9/2 F, 2 S, 1.6; 114/264, 266, 267, 219, 77 R, 263; 14/71.1, 71.5, 27, 69.5

[56] References Cited

U.S. PATENT DOCUMENTS

| | | | |
|---|---|---|---|
| 3,289,621 | 12/1966 | Sebring | 114/266 |
| 3,306,053 | 2/1967 | Fulton | 114/219 |
| 3,492,825 | 2/1970 | Pearson | 114/263 |
| 3,614,871 | 10/1971 | Nordell | 405/221 |
| 3,684,139 | 8/1972 | Johnson | 9/2 F |
| 3,763,808 | 10/1973 | Smith | 114/266 |
| 4,070,980 | 1/1978 | Shorter | 114/263 |

*Primary Examiner*—Trygve M. Blix
*Assistant Examiner*—D. W. Keen
*Attorney, Agent, or Firm*—Flehr, Hohbach, Test

[57] ABSTRACT

A boat dock comprising a deck structure which floats in water and which provides access to shore and an elongate outrigger which floats in the water and which stabilizes the dock structure. In addition, the dock includes a lockable hinge which connects the dock structure to the outrigger. This hinge locks the outrigger in an extended position from the dock for stabilizing the dock and pivots the outrigger to a retracted position folded about the dock for collapsed storage.

4 Claims, 5 Drawing Figures

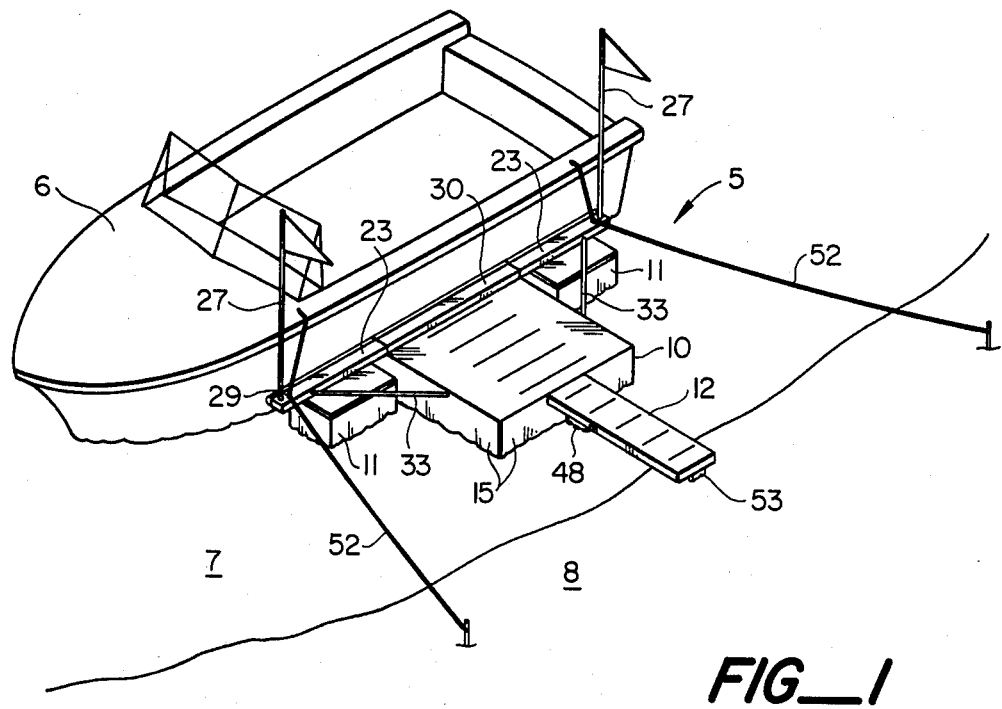
FIG_1
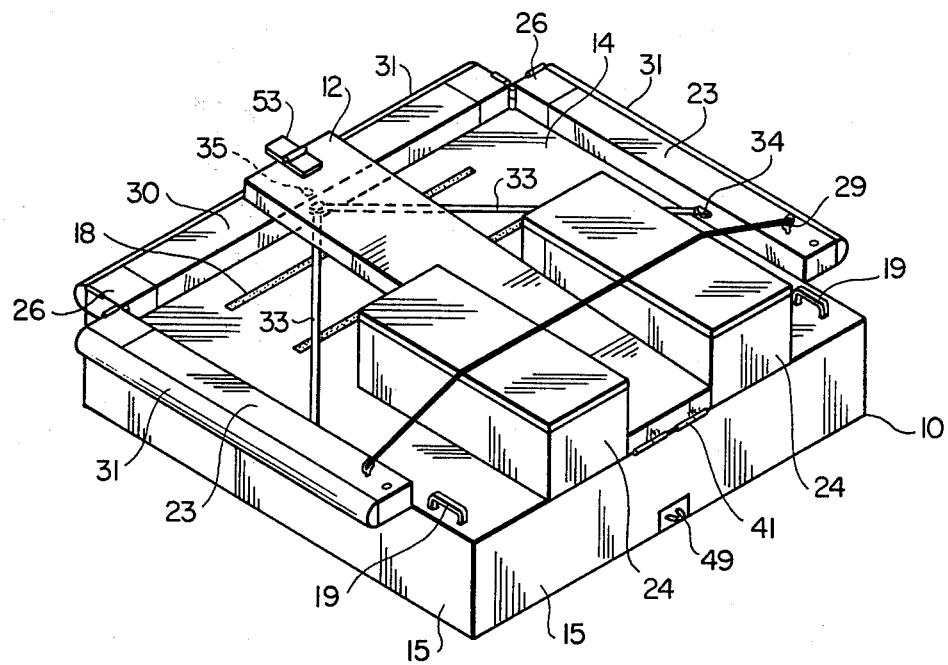
FIG_2

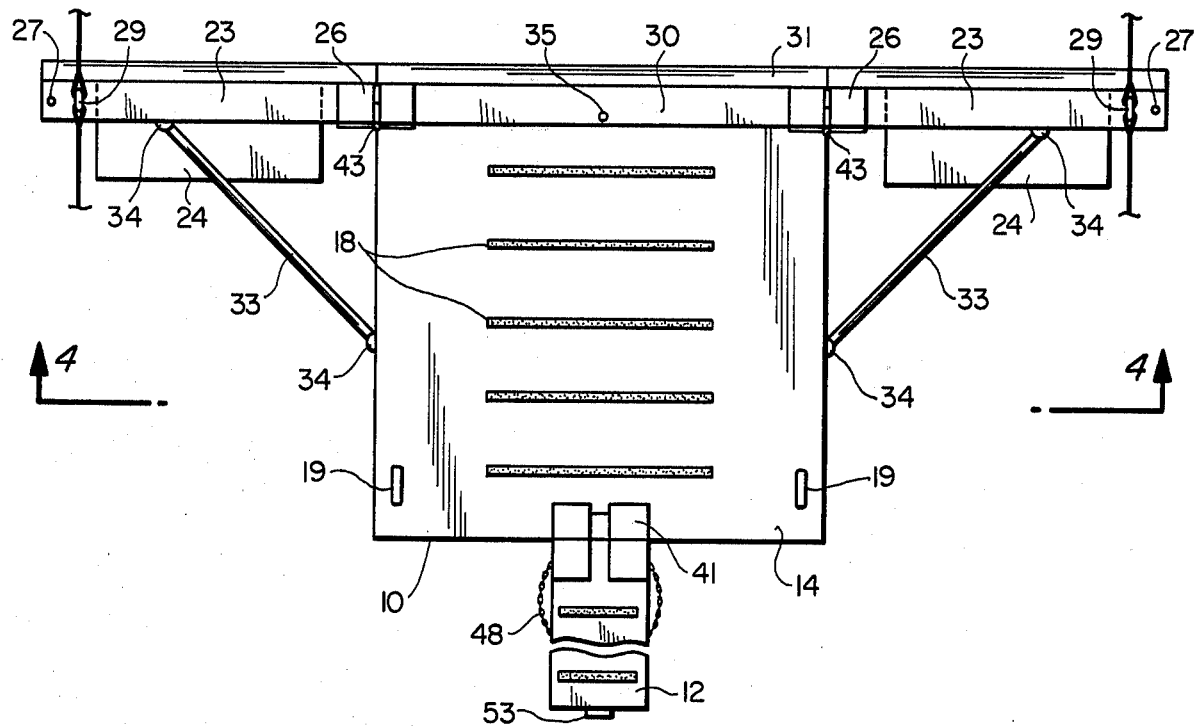
FIG_3
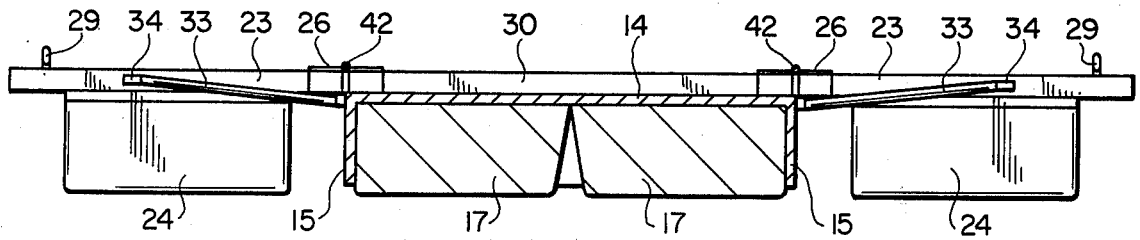
FIG_4
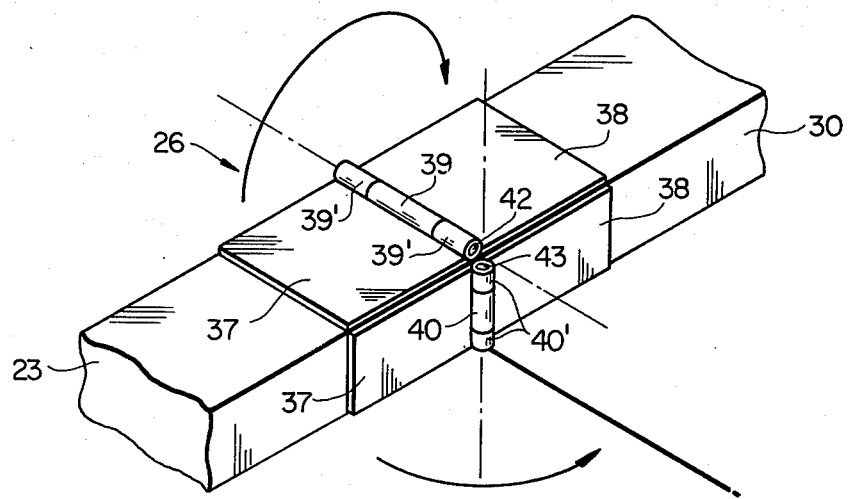
FIG_5

PORTABLE BOAT DOCK

The present invention generally relates to docks and, more particularly, to portable boat docks that are capable of collapsed storage.

Heretofore, boats have been moored in lakes and streams where permanent docks are not available by using an anchor and a line fixed to a permanent object on shore. To moor in this manner, an anchor is dropped from the stern as the boat approaches the intended mooring site. Then before the boat hits the bank, the one member of the crew jumps over the bow and secures a line to a permanent object on shore. Momentum toward the shore is arrested by the anchor. The boat is secured with the bow facing toward the shore. The position of the boat relative to the anchor and to the shore is adjusted so that the boat does not rub against the bottom.

Although this procedure is widely used, it is often inconvenient. One problem is that members of the crew must embark and disembark from the bow of the boat. This is often difficult because on some boats the bow sits high out of the water. Another problem is that the crew must travel across a muddy bottom before embarking into the boat. Mud thus gets carried into the boat and must be washed away frequently. Further, by traveling across a slick, muddy bottom, the members of the crew are subject to the possibility of injury from falling.

One advantage of the present invention is that it provides a convenient deck structure that facilitates embarking, loading, and disembarking from water craft at locations where permanent docks are not available. The dock described herein is convenient because it can be folded into a collapsed storage configuration and carried in the rear of a boat from one mooring site to another.

Also an advantage of the present invention is that the boat dock described herein provides a floating bridge between the shore and the deck of a boat. The boat dock thus provides a safe, easy, dry means of travel between the boat and the shore.

A further advantage of the present invention is to provide standoff protection for boats from the shore. The dock described herein ensures that fiberglass bottomed boats do not get scraped and do not have their exterior gelcoat surfaces scratched. Such scratching, if not repaired, permits water to enter the fiberglass laminate of the boat.

Still another advantage of the present invention is that it helps to keep the boat clean and free of mud. This feature is achieved because the crew of the boat is no longer required to walk in the mud when embarking from shore. Mud is thus no longer tracked into the boat.

Another advantage of the present invention is that in case of an emergency any boat secured to the dock described herein can be quickly cast off. The dock described herein permits easy access to a boat from a shore and the mooring lines are more accessable than a submerged anchor and a line tied to shore.

These and other objects and advantages are achieved by a boat dock comprising a deck structure which floats in water and which provides access to shore and an elongate outrigger which floats in the water and which stabilises the dock structure. In addition, the dock includes a lockable hinge which connects the dock structure to the outrigger. This hinge locks the outrigger in an extended position from the dock for stabilizing the dock and pivots the outrigger to a retracted position folded about the dock for collapsed storage.

Additional objects and features of the invention will appear from the following description in which the preferred embodiment has been set forth in detail in conjunction with the accompanying drawings.

FIG. 1 is a perspective view of a boat dock in operation according to the present invention.

FIG. 2 is a perspective view of the boat dock of FIG. 1 in the storage configuration.

FIG. 3 is a top plan view of the boat dock of FIG. 1.

FIG. 4 is an end elevational view, in section taken along line 4—4 of FIG. 3.

FIG. 5 is a perspective view of a hinge for the boat dock of FIG. 1.

FIG. 1 illustrates a preferred embodiment of the boat dock 5 of the present invention while in operation. A boat 6 located in the water 7 is moored to the boat dock which in turn is moored to the shore 8. The boat dock includes a deck structure 10, two outriggers 11 and a gang plank 12 which connects the deck structure to the shore.

Referring to FIGS. 2, and 4, the deck structure 10 includes a wooden deck 14 and four wooden side walls 15. The deck and side walls cover two blocks 17 of Styrofoam which provide flotation for the boat dock. In FIG. 4 it should be noted that the Styrofoam is cut longitudinally with a slot in the shape of an inverted V. This slot provides stability so the boat dock when members of the crew are embarking and disembarking. The upper surface of the wooden deck and the gang plank is covered with a plurality of non-slip surfaces 18 which are applied to ensure that members of the crew do not slip. The wooden deck also includes two handles 19 which are used to lift the boat dock when it is in the collapsed configuration, FIG. 2.

Each outrigger 11 includes an anchor arm 23 and a float 24. The anchor arms are fabricated from wood and are connected by a hinge 26 to the deck structure 10 as described below. Removably attached to each anchor arm is a float 24 fabricated from a styrofoam block. The floats are attached to the anchor arms with L-shaped brackets and screws and are removed for storage as illustrated in FIG. 2. The purpose of each outrigger is to provide stability to the boat dock and to provide two widely separated points of attachment for the boat 6. By using outriggers, the boat dock can be used to secure boats having a length of many times the width of the deck structure 10. The anchor arms are connected to an arm mounting 30 by a hinge 26 illustrated in detail in FIG. 5. The arm mounting is an integral part of the deck structure 10. At the free end of each anchor arm is an eye bolt 29 and a flag 27. The eye bolts are used for mooring boats to the dock and for securing the dock to the shore as illustrated in FIG. 1. The flags are used for warning other boats of the presence of the dock in the water. The anchor arms 23 and the arm mounting 30 are faced with a resilient bumper 31 which is cemented to the front of the boat dock in three sections. The bumper protects against scratching the hulls of the boats moored to the boat dock.

The anchor arms 23 are secured in the extended position, FIG. 3, by the locking hinges 26 and the two brace rods 33. The hinges are described in detail below. The brace rods are hollow cylindrical tubes with a straight eye mounted in the end of each tube. The eyes in turn are mounted to the side walls 15 of the deck structure and to the anchor arms 23 by conventional deck mounts 34. The purpose of the brace arms is to transmit any forces on the free ends of the anchor arms to the deck structure 10. For example, the brace arms prevent breakage of the outriggers if a boat collides into one of the locked anchor arms. The brace rods 33 are also used to secure the anchor arms 23 in the stowed configuration as illustrated in FIG. 2. Referring to FIG. 3, the deck structure 10 has a tapped hole 35 on the arm mounting 30 which is used to bolt the ends of the brace rods for stowage.

Referring to FIG. 5 each anchor arm 23 can be locked in the extended position using the hinge 26. Each hinge includes two corresponding leaf members 37, 38. Each leaf member 37, 38 is generally elongate and has an L-shaped cross section. Each leaf member has two perpendicular cylindrical hollow knuckles 39, 40, 39', 40' mounted on one end. Knuckles 39, 40 are a rigid, integral part of leaf member 37 and knuckles 39', 40' are a rigid part of leaf member 38. The knuckles on opposing leaf members 37, 38 are complementary. The two corresponding knuckles 39, 39' are engaged by a pin 42 and the other corresponding knuckles 40, 40' by pin 43. Each pin is removable and also has detents to ensure that it remains in place if desired. Referring to FIG. 5 pin 43 is aligned along the vertical axis and permits pivotal motion of the anchor arm about that axis. Pin 42 is aligned along the horizontal axis and permits vertical rotation. Such vertical rotation is used for an alternate storage configuration (not shown). If both pins are inserted into the hinge simultaneously, then the anchor arm can be locked in the extended position. If both pins are removed, then the arm can be disconnected from the arm mounting 30.

Referring to FIGS. 1–3, the gang plank 12 is secured to the deck structure 10 by two hinges 41. These hinges permit the gang plank to be folded over in the storage configuration as illustrated in FIG. 2. The pivotal motion of the gang plank about the hinges is prevented by a chain 48 which is secured to a deck mount 49, FIG. 2. During operation the chain prevents the front of the boat dock (arm mounting 30) from rising up excessively when a member of the crew steps on the dock near the hinges. In other words, the chains prevent the boat dock and the gang plank from becoming V-shaped when a member of the crew travels across the gang plank and deck structure 10.

It should be understood that the wooden parts of the boat dock as well as the Styrofoam are covered with fiberglass. In addition, the metal components are either fabricated from stainless steel or painted with marine paint to avoid corrosion.

Referring to FIG. 2, the boat dock is illustrated in the stowed configuration. The anchor arms 23 are folded back around the vertical axis of the hinges 26 and the brace rods 33 are bolted to the tapped hole 35, FIG. 3. Bottom of gange plank has kick plate No. 53. The gang plank 12 is folded over on top of the arm mounting 30 and the brace rods. The chains 48, FIG. 3 and the flags 27, FIG. 1 have been removed. The floats 24 are positioned on either side of the gang plank and are secured by a line which passes between the eye bolts 29.

In the stowed configuration illustrated in FIG. 2 the boat dock is normally carried in the rear of a boat such as that illustrated in FIG. 1. The boat dock is portable and can be handled by two people by grasping the handle 19 and the hinge 26.

To place the boat dock into operation, the folded dock is first removed from the boat 6, placed in the water, and floated into position. Then the anchor arms 23, FIG. 2 are swung out about the vertical axis of the hinges 26 and pin 43 to the extended position as illustrated in FIG. 3. Then the pin 42, FIG. 5 is put in each hinge to lock the anchor arms in place. The floats 24 are thereafter attached to the anchor arms and the gang plank 12 is unfolded. The gang plank has means at its free end for staking it to the shore 8, FIG. 1. The stakes at the end of the gang plank prevent the boat dock and the boat from being pushed toward the shore by the current and the wind. Next, the dock mooring lines 52 are secured between the eye bolts 29 and the shore so that the boat dock makes a three point attachment with the shore as illustrated in FIG. 1. The brace rods 33 are then mounted on the side walls 15 of the deck structure, the chains 48 are attached between the gang plank 12 and the deck mount 49, and flags 27 are installed.

The dock is now ready for mooring a boat. Typically, a boat is moored to the dock in the conventional manner by passing lines between the cleats on the boat and the eye bolts 29, FIG. 3.

The boat dock is returned to the stored configuration, FIG. 2 by following the above described steps in reverse order.

In one embodiment of the present invention which has been constructed, the deck 14 had a length and width of four feet by four feet. Each anchor arm 23 was three feet in length so that the span between the two eye bolts 29, FIG. 3 was ten feet. The entire dock weighed approximately eighty pounds so that it can be handled easily by two people.

It should be understood that although the best mode contemplated for carrying out the present invention has been shown and described, it will be apparent that modification and variation may be made without departing from what is regarded to be the subject matter of the invention.

What is claimed is:

1. A boat dock assembly comprising:
   (a) a main dock structure having a top side, an underside and a block of rigid foam material mounted to said underside for providing buoyancy to the dock structure;
   (b) a pair of elongated outrigger arrangements adapted to float in water for stabilizing said main dock structure, each of said outrigger arrangements including an elongated rigid arm, means for disengagably connecting one end of said arm with said dock structure, a float removably connected to said arm, and an elongated cushion serving as a bumper guard fixedly connected to and extending along one side of said arm, said outrigger arrangements being located on opposite sides of said main dock structure and each of said connecting means including a hinge mechanism which operates in a first way for fixedly connecting its associated arm in an operating position with said dock structure and a second way for pivotally connecting its associated arm with said dock structure such that said arm is pivotally movable about a given axis between its operating position and a folded-away stored position, each of the said hinge mechanisms also operating in a third way for pivotally supporting its associated arm to said dock structure about a second axis perpendicular to said first-mentioned axis such that its arm is movable between said operating position and a second folded-away stored position;

(c) means disengagably connected between said dock structure and each of said outrigger arrangements for providing reinforcement between the latter and said dock structure; and (d) a plank arrangement including an elongated plank and means for disengageably connecting one end thereof to said main dock structure.

2. A boat dock assembly according to claim 1 wherein said main dock structure is rectangular and wherein said outrigger arrangements and one side of said dock structure lie on a common coincident axis.

3. A boat dock as in claim 1 wherein each of the hinge mechanisms includes two opposed leaf members, each member having an L-shaped cross section and two knuckles, one knuckle being perpendicular to the other and both knuckles being located at the same end of the L-shaped cross section of the leaf member, the two knuckles on each leaf member engage two corresponding knuckles on the other leaf member; and two pins each insertable into the correspondingly engaged knuckles for rigidly joining the two leaf members together and for providing pivotal motion of the outrigger with respect to the dock along said first and second perpendicular axes.

4. A boat dock as in claim 1 wherein said block of rigid foam has an inverted V-shaped notch that extends perpendicularly to the outrigger arrangement in order to provide stability to the dock.

* * * * *